W. J. LEIGHTY.
CUTTING DEVICE.
APPLICATION FILED JUNE 5, 1918.
1,327,715.
Patented Jan. 13, 1920.
5 SHEETS—SHEET 3.
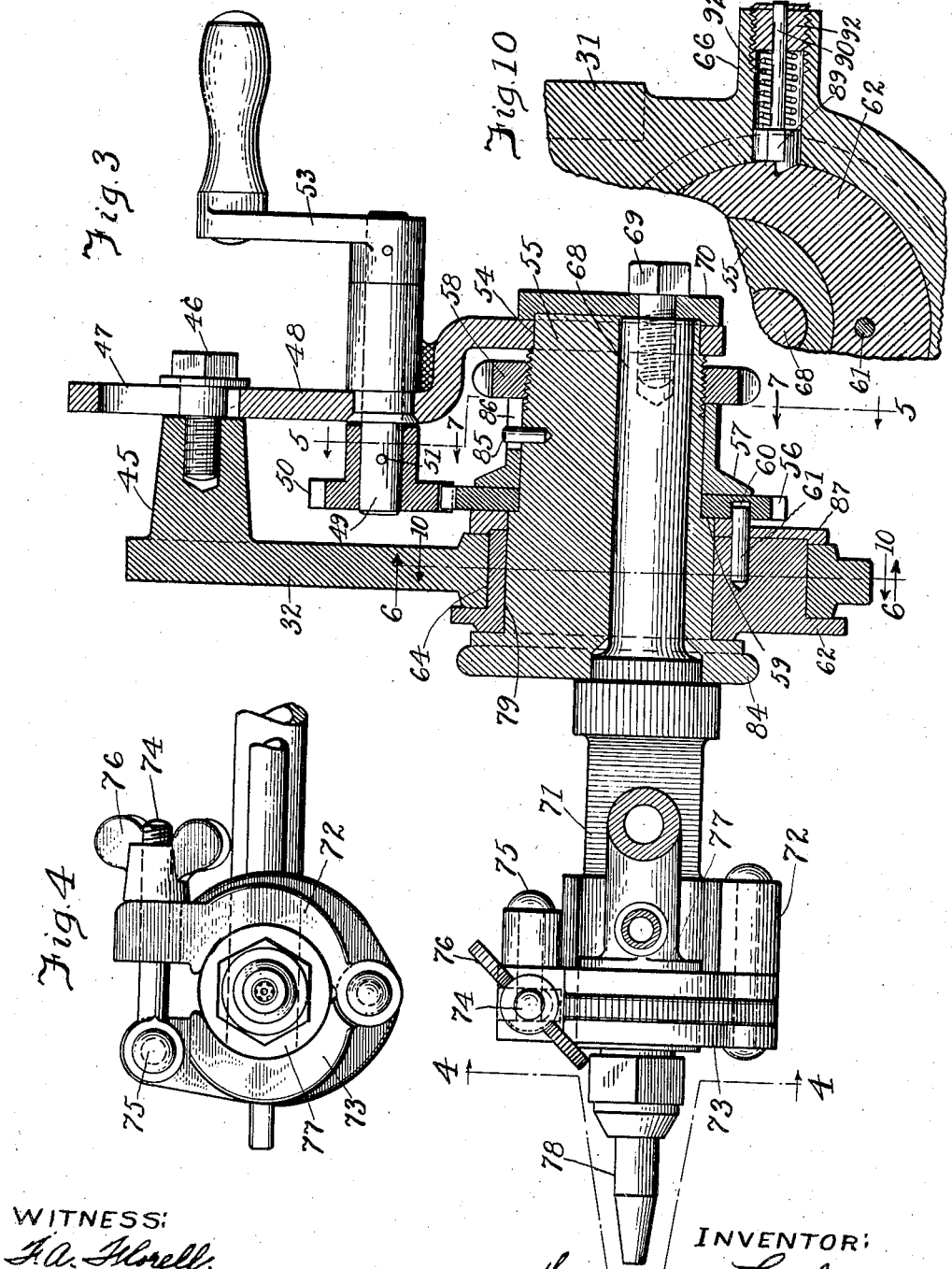

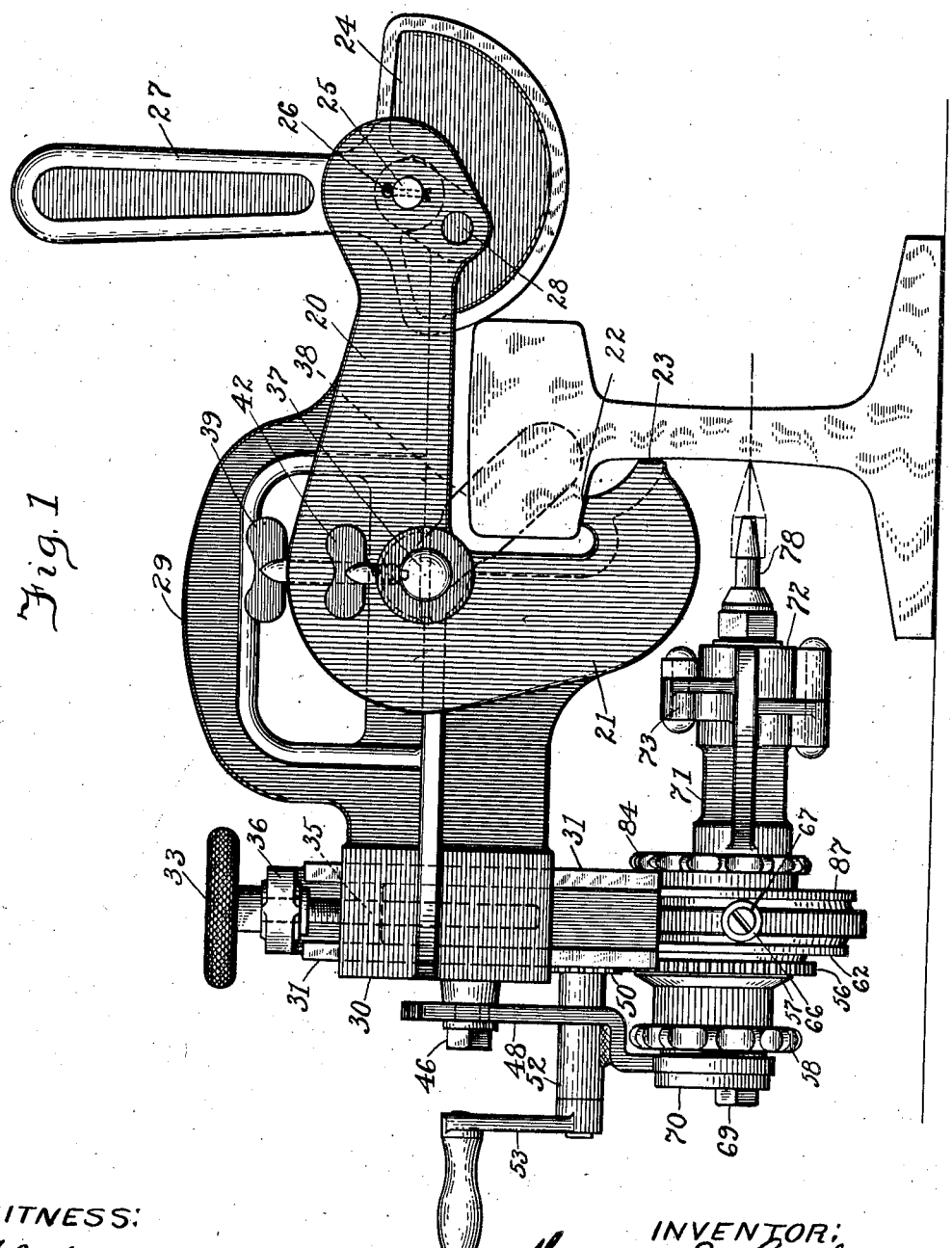

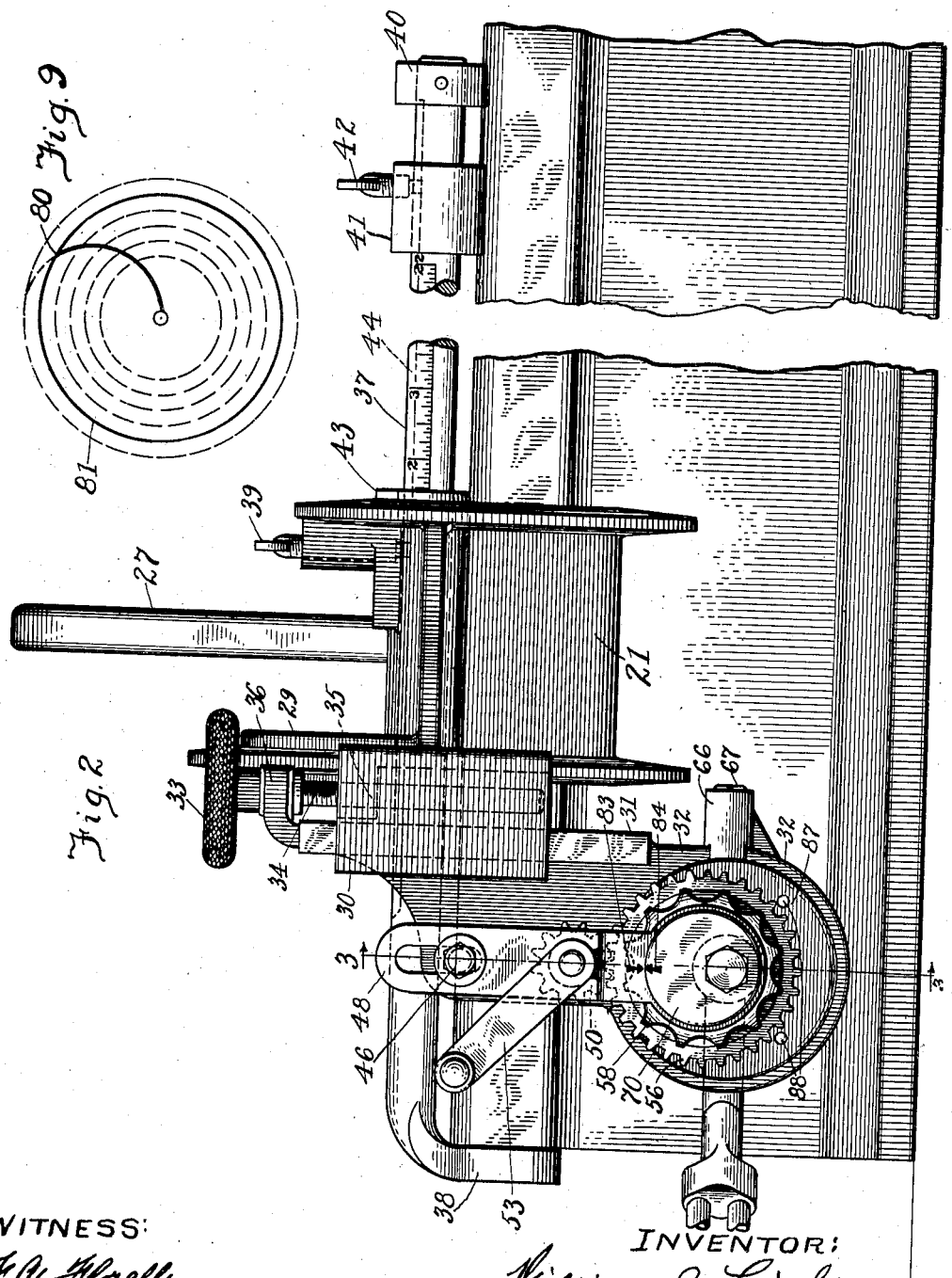

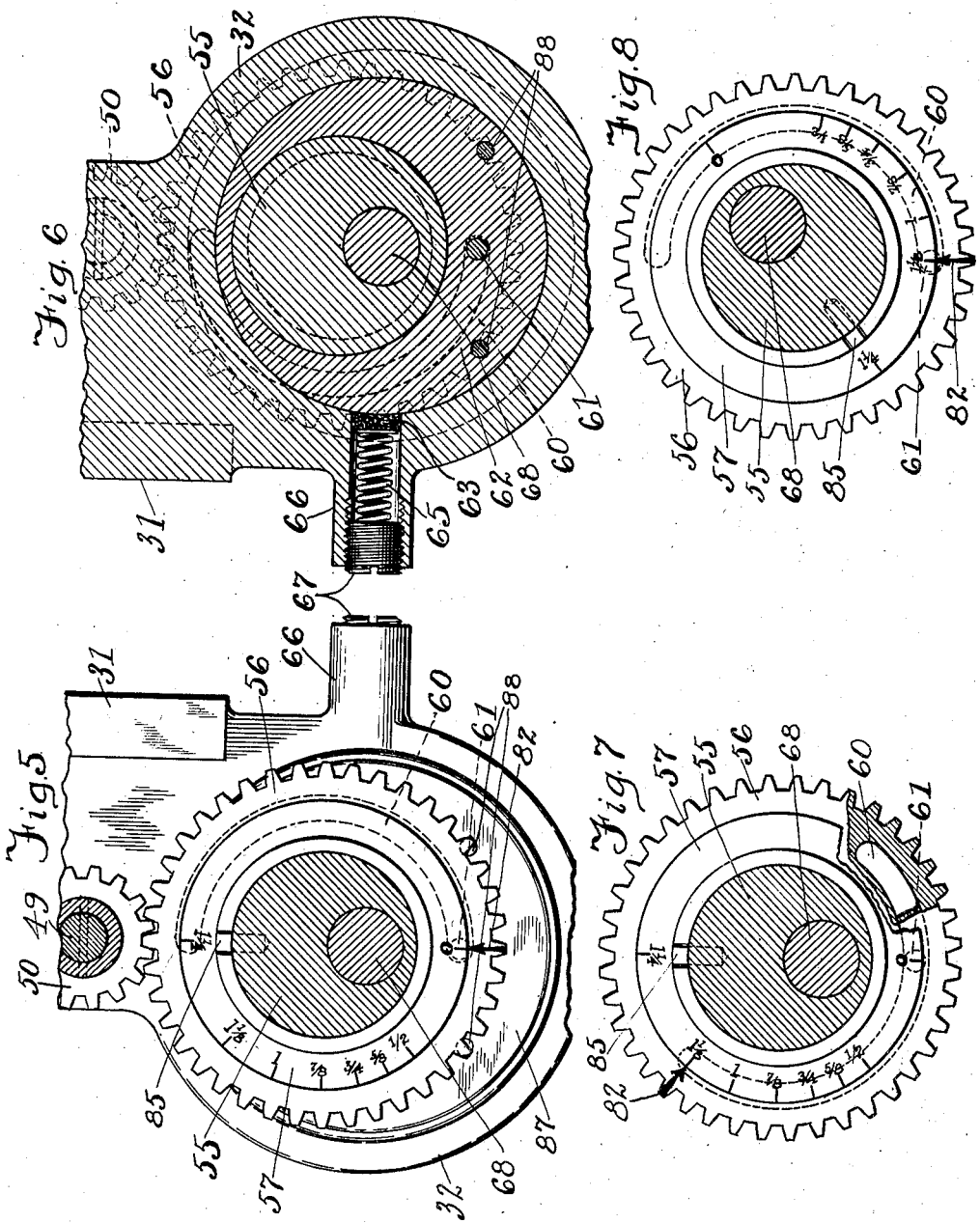

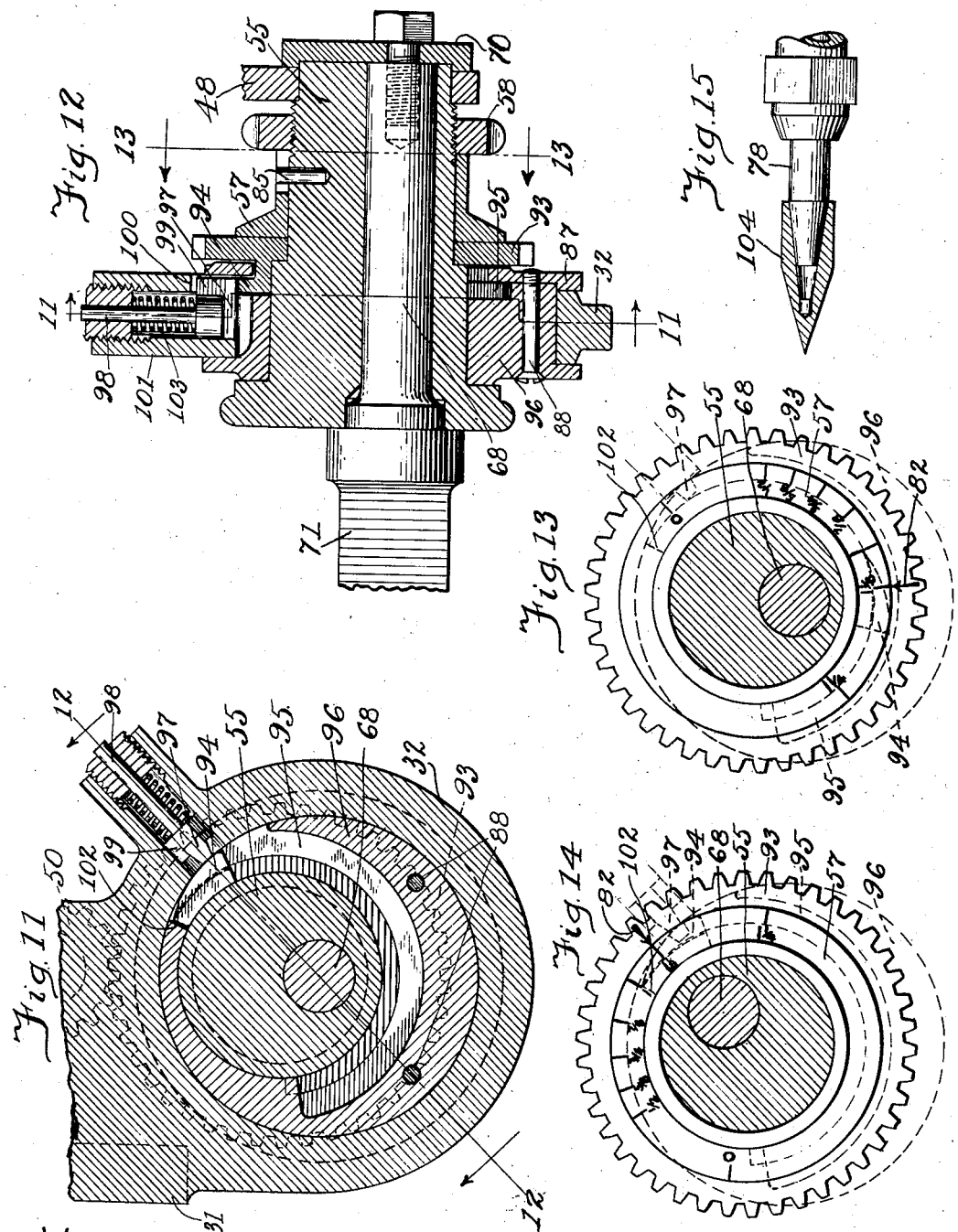

UNITED STATES PATENT OFFICE.

WILLIAM J. LEIGHTY, OF CHICAGO, ILLINOIS.

CUTTING DEVICE.

1,327,715. Specification of Letters Patent. Patented Jan. 13, 1920.

Application filed June 5, 1918. Serial No. 238,355.

*To all whom it may concern:*

Be it known that I, WILLIAM J. LEIGHTY, a citizen of the United States, and a resident of Chicago, in the county of Cook and State of Illinois, have invented certain new and useful Improvements in Cutting Devices, of which the following is a description, reference being had to the accompanying drawings, which form a part of my specification.

My invention relates more particularly to a device for cutting holes in structural metal, as for example railway rails and the like; the object of the invention being to provide a device for cutting or piercing holes in metal plates or webs with a suitable cutting flame produced by a suitable blow-pipe or torch.

My invention contemplates a device of the character mentioned whereby the initial piercing of the metal with the cutting flame is adapted to be made at the center, or some point within the perimeter or circumference of the hole to be cut; the invention providing a device which enables the cutting torch or blow-pipe to be drawn or moved from the center, or initial cutting point, outward to an extent or radius desired; then causing the torch or blow-pipe to be carried or swung in a true circle about the initial piercing point and describing the hole it is desired to cut; the device enabling the torch to be moved through said circle without necessitating or making a stop at the point of intersection of the radial line cut from the center, or initial point, outward with the circumference or perimeter, with the result that a true circle or round hole is cut by the cutting flame.

My improved device, as specifically illustrated in the drawings, applies more particularly to T-rails, commonly known as railroad rails; and it presents a device provided with adjustable means whereby the holes to be cut can be located in a vertical position, relative to the top or bottom of the rail, and also in a horizontal direction, suitable for various sized T-rails; the device also comprising means for quickly clamping the device to the heads or upper portions of the rails, or structural members on which the device is intended to be used.

The above enumerated objects and the advantages inherent in the construction will be more fully comprehended from the detailed description of the accompanying drawings, wherein:—

Figure 1 is a side elevation of my improved device or hole cutting machine, showing the same clamped to the head of a T-rail in operative position.

Fig. 2 is an end elevation of my improved device as shown in Fig. 1, with a portion of the gage for locating the position of the hole to be cut, and a portion of the rail shown broken away.

Fig. 3 is a vertical sectional view taken on the line 3—3 of Fig. 2 looking in the direction of the arrows.

Fig. 4 is a detail view, with portions broken away, illustrating the clamping means for the blow-pipe or torch and the end of the cutting torch or blow-pipe; the view being taken on the line 4—4 of Fig. 3 looking in the direction of the arrows.

Fig. 5 is a partial cross sectional view taken on the line 5—5 of Fig. 3 looking in the direction of the arrows and illustrating the driving gear and adjusting dial.

Fig. 6 is a cross sectional view taken on the line 6—6 of Fig. 3 looking in the direction of the arrows.

Fig. 7 is a partial sectional view taken on the line 7—7 of Fig. 3 looking in the direction of the arrows, showing the adjusting dial in relation to the driving gear set at center or initial piercing position of the blow-pipe or torch.

Fig. 8 is a partial cross sectional view taken on the same line, 7—7, of Fig. 3, and illustrating the driving gear with relation to the adjusting dial, with the cutting blow-pipe or torch and controlling means advanced to radial position for which the device was previously adjusted.

Fig. 9 diagrammatically illustrates the travel or course of the cutting blow-pipe or torch from the piercing, or initial cutting position, through the radius and perimeter of the circle or hole for which the device was previously adjusted.

Fig. 10 is a sectional view, with portions broken away, taken on the line 10—10 of Fig. 3, looking in the direction of the arrows, and illustrating a modified form of my device.

Fig. 11 is a cross sectional view taken through the head of the device, illustrating a modified form; the view being taken through the device on the line 6—6 of Fig.

3 and line 11—11 of Fig. 12 looking in the direction of the arrows.

Fig. 12 is a cross sectional view of the modified form shown in Fig. 11 and taken on the line 12—12 of Fig. 11 looking in the direction of the arrows.

Fig. 13 is a partial cross sectional view taken on the line 13—13 of Fig. 12 looking in the direction of the arrows and showing the relation of the driving gear to the adjusting dial, with the cutting torch or blow-pipe disposed at the center or piercing point and the dial set for a predetermined radius.

Fig. 14 is a partial sectional view taken on the same line 13—13 of Fig. 12 showing the driving gear and adjusting dial with the cutting torch advanced in accordance with the predetermined setting shown in Fig. 13 for cutting the sized hole determined by the radius described by the cutting torch.

Fig. 15 is a detail view, partially in section, of a centering device adapted to be applied to the torch or blow-pipe tip, as illustrated in Fig. 1 in dotted lines.

In the device as illustrated in the drawings, a particular type of clamping means for securing the device to the head of a T-rail is illustrated, but it will be understood that various other forms of clamping means may be provided for securing my improved device to the rail or other structural shapes or plates, as my improved device is adapted for cutting holes in all kinds of structural shapes of steel, wrought iron, etc.

In the particular exemplification of my invention, the device comprises a main frame 20, a part whereof is adapted to extend transversely of the rail or structural shape, as shown in Fig. 1, while a portion of the frame 20 depends below the rail head, in the form of a flanged bracket 21, provided with the rail-engaging or bearing points 22 and 23; the one point being adapted to engage beneath the head of the rail while the other point engages with the web portion of the rail.

The portion of the main frame 20, disposed across the rail, is provided with a cam 24, pivoted on a pin 25 extending through a suitable hole in the main frame 20; the pin being secured in place by a cotter-pin or any suitable means 26. The cam 24 is shown provided with a suitable lever 27 by means of which the cam may be readily oscillated and brought into "biting" relation with the head of the rail, as shown in Fig. 1. The main frame 20 is shown provided with a plurality of holes, as at 28, for the purpose of permitting adjustment of the cam 24 to different sized rail-heads and enables it to be brought into gripping or "biting" relation with various sized structural members.

The main frame 20 is shown provided with an upstanding portion or rib, see Fig. 1, which is perforated so as to provide a handle or suitable grasp, as shown at 29, for carrying the device from place to place.

One end of the main frame portion 20 terminates in the vertically disposed head or frame portion 30 for carrying a guide 31. The guide 31 supports the blow-pipe or torch-holding and controlling mechanism which comprises the frame portion 32, more clearly shown in Fig. 2. The guide 31, which is disposed through the frame portion 30, permits vertical adjustment of the frame portion 32 and the torch-holding and controlling mechanism supported thereby. The vertical adjustment just referred to is effected by operation of the adjusting hand wheel 33, see Figs. 1 and 2, secured to the threaded shaft 34 which extends through the tapped stationary extension 35 shown in dotted lines in Figs. 1 and 2; the extension 35 being a part of the main frame 20 of the device. The threaded shaft 34 is arranged to rotate in the upwardly presented portion 36 formed integral with the guide 31 of the frame portion 32 which carries the blow-pipe or torch guide or operating mechanism.

In order to determine the positions of the holes or piercing points, relative to the end of the T-rail in a horizontal direction, I provide the device with a graduated member or gage 37, see Figs. 1 and 2, adapted to be disposed lengthwise of the rail or other structural member intended to be pierced. The gage member 37 has one end disposed downwardly and preferably at an angle as shown in Figs. 1 and 2 at 38, so as to enable the downwardly disposed end 38 to abut against the end of the T-rail or other structural member. The gage 37 extends through the main frame portion 20 of the device and is held in adjusted positions by a set-screw 39; while the end of the gage, disposed beyond the frame portion of the device, is provided at its end with a permanently secured collar 40 which prevents the gage 37 inadvertently moving out of the main frame portion and at the same time prevents a collar 41, slidably mounted on the gage 37, from slipping off the gage when the device is not in use; the collar 41 slides lengthwise of the gage 37 and is held in adjusted position by a set-screw 42; the collar 41 being shown set on the gage at a predetermined point so as to determine the distance from the end of the rail at which a second hole is to be pierced.

When it is desired to shift the device lengthwise of the rail to the position where the second hole is to be pierced, the device may be moved lengthwise of the gage 37 by loosening set-screw 39 and cam 24; the cam 24 being readily moved out of "biting" or clamping relation with the rail through proper operation of lever 27. This will release the clamping relation between the rail and the device and permit the device to be moved lengthwise of the rail until the boss portion 43, see Fig. 2, on the main frame 20 of the device comes into abutting relation with the collar 41 which is secured in place by the set screw 42; the end of the screw 42 is shown taking into a longitudinal slot formed in the gage 37 and indicated in dotted lines in Fig. 2 at 44.

As is evident from the construction and foregoing description, the gage 37 can be set for drilling two holes in the web of the rail; the first hole being determined by the position of the device on the gage as determined by set-screw 39, which, as shown in dotted lines in Fig. 2, also extends into the slot 44 of the gage 37; while the second hole is determined by the positioning of the collar 41 against which the frame of the device abuts as previously described after the first hole has been pierced; the gage 37 having sliding relation with the main frame of the device, thus permitting any horizontal adjustment of the device within the range of the gage.

The frame portion 32, which carries the blow-pipe or torch-controlling mechanism, is provided with a lug 45, see Fig. 3, in which a guide set-screw 46 is secured; the set-screw 46 extending through an opening or slot 47 formed in a guide member 48 which carries the driving spindle 49 on which driving gear 50 is secured by means of a pin 51. The guide member 48 is controlled by the set-screw 46. The driving spindle 49 is rotatably mounted in the bearing portion 52 of the guide member 48; while the outer end of the spindle 49 is provided with a hand crank 53, through the operation of which pinion 50 will be rotated. The guide member 48 forms a bearing at the point 54 on the adjusting eccentric member 55. The member 48 constantly keeps pinion 50 in mesh with a gear 56 which is frictionally secured on the radius eccentric member 55 by means of an adjusting dial 57. The dial 57 has an extended sleeve portion as shown in Fig. 3; the adjusting dial being pressed into firm relation with the gear 56 by means of a nut 58, with the result that gear 56 will be maintained in firm operative relation with the shoulder 59 on the radius eccentric member 55; the nut 58 being threaded on the end of the eccentric member 55, as shown in Fig. 3. The gear 56 is firmly clamped against the shoulder 59 on eccentric member 55 through the medium of dial 57 and nut 58 so as to cause eccentric member 55 and gear 56 to rotate together; or, in other words, so that operation of crank 53 will impart rotary movement to eccentric member 55 through the medium of pinion 50 and gear 56.

Gear 56 is shown provided with an arcuate slot 60, see Figs. 3, 5 and 7, into which a dowel pin 61 extends; the dowel pin 61 being positively located in a suitable hole formed in a second eccentric member 62. The eccentric member 62 is rotatably mounted in the frame portion 32 and is frictionally held by the friction-inducing mechanism shown at 63 in Fig. 6. The mechanism is shown in the nature of a leather disk, or other suitable medium, held in frictional contact with the periphery or bearing surface 64 of eccentric member 62 by spring 65 mounted in a suitable housing or extension 66 formed on the frame portion 32; the housing 66 being provided with a threaded opening to receive the adjusting plug or screw 67 whereby tension of spring 65 may be controlled.

The radius eccentric member 55 is provided with an opening extending longitudinally therethrough to receive the spindle 68 of the blow-pipe or torch-holding means; the spindle 68 being rotatably secured in radius eccentric member 55 by means of set-screw 69 whereby a cap 70 is held against guide-member 48, thus, in turn, securing guide-member 48 in position on the end of radius eccentric member 55.

The outer end of the spindle 68 is provided with a clamp head portion 71 which is provided with a movable jaw 72, see Fig. 4, and a stationary jaw 73; the operative relation between the two jaws being maintained by an eye-bolt 74 pivotally secured at 75 to stationary jaw 73, while the free, threaded end of the bolt is provided with a wing or butter-fly nut 76. The jaw members 72 and 73 are adapted to extend about the body of the torch or blow-pipe, indicated at 77; the clamping relation of the jaws being effected by screwing nut 76 onto eye-bolt 74, and the blow-pipe or torch 77 thereby firmly secured in the head 71 which is integral with spindle 68. This mechanism, however, merely frictionally holds the blow-pipe and permits it to be forcibly rotated or oscillated in the clamp-head 71 when desired.

The tip 78 of the torch or blow-pipe is so clamped in the jaw members 72 and 73 that it will be in alinement with the longitudinal axis of spindle 68; and by holding the handle of the torch or blow-pipe in any predetermined position, while pinion 50 is revolved through operation of crank 53, it is evident that the torch-tip 78 will be carried by the radius eccentric member 55 through the arc of a circle resulting from the rotation of eccentric member 55 through the medium of gear 56 meshing with pinion 50.

As previously stated, the gear 56 is provided with a slot 60 which describes the arc of a circle, as shown in dotted lines in Figs. 5, 6 and 7, into which the dowel pin 61 protrudes. With the eccentric member 62, frictionally engaged by the friction-inducing means 63, through the action of spring 65, see Fig. 6, eccentric member 62 will be normally held against rotation during the initial rotation of gear 56, and it is evident therefore that radius eccentric member 55 will rotate with gear 56 without imparting rotation, for a predetermined period, to eccentric 62, namely not until the dowel pin 61 reaches the end of the arcuate slot 60 when the two eccentrics 55 and 62 will rotate in unison. It is apparent, therefore, that during the initial rotation of the mechanism, eccentric member 55, which carries spindle 68 of the blow-pipe or torch-holding means, will revolve within eccentric member 62 on the bearing surface 79, see Fig. 3, until positive connection between the two eccentric members 55 and 62 is effected by the dowel pin 61 reaching the end of the arcuate slot 60 in gear 56, when both eccentric members 55 and 62 will rotate together about the bearing surface 64 in the frame member 32 and the tip of the blow-pipe or torch thereby forced to describe the arc of a circle concentric with that described by member 62.

As a result of the action just described, the torch tip 78 will be induced to move initially in the arcuate, radial manner shown in Fig. 9 from the center to the point indicated at 80 at the perimeter during the rotation of eccentric member 55 within eccentric member 62. After the tip reaches the point 80, it will be forced to describe the circle indicated at 81 in Fig. 9 through the rotation of eccentric member 62; such movement or action continuing as long as the mechanism is rotated in proper direction through the operation of crank 53 in clockwise direction.

The size or diameter of the circle 81 described by the torch tip 78 is determined by adjustment of the adjusting dial 57 which is provided with suitable graduations, as shown in Figs. 5 and 7, where the torch or blow-pipe bearing spindle 68 is shown in its neutral position, namely where it is substantially at the center of eccentric member 62. The dial 57, when set at zero, as shown in Fig. 5, will not allow the eccentric 55, carrying spindle 68, to revolve about the bearing surface 79 within eccentric member 62, as the dowel pin 61 immediately engages the gear 56 and causes the eccentric 55 with the torch spindle 68 to remain in the same position, as it is centrally located relative to the bearing surface 64, namely within eccentric member 62, as shown in Fig. 6. However, if the gear 56 is rotated to the position shown in Fig. 7, where the arrow, indicated at 82, registers with the graduation or mark one and one-eighth (1⅛) on dial member 56, thereby locating the end of the slot 60 in the gear 56, the torch will be caused to describe a circle whose radius is equal to the arcuate movement permitted eccentric member 55, namely until pin 61 reaches the end of slot 60, which will result in a hole of the size indicated being cut; the spindle 68, and therefore the torch-tip 78, being in central position ready to pierce the center or starting point of the hole eventually to be cut by proper operation of the mechanism.

Revolving crank 53 in clockwise direction, to which gear 50 is connected, and thereby rotating gear 56 in counter-clockwise direction, rotates radius eccentric member 55 from the position shown in Fig. 7 to the position shown in Fig. 8, at which time dowel-pin 61 will have reached the end of slot 60 in gear 56, causing a positive relation to exist between gear 56 and eccentric member 62, so that rotary motion will now be transmitted to eccentric 62 and therefore be transposed from the bearing surface 79 intermediate of eccentric 55 and eccentric 62 to the bearing surface 64 intermediate of eccentric 62 and frame member 32. It is evident from this action that the radius of the hole to be cut will be equal to the difference in positions of the torch-bearing spindle 68, as shown in Figs. 7 and 8; in other words, the radius of the hole to be cut with the mechanism adjusted as illustrted in Fig. 7, will be equal to the extent to which spindle 68 has been advanced from the central position indicated in Fig. 7 to the eccentric position shown in Fig. 8, namely with the torch-tip having been moved from the center or starting point through the arcuate radius, as shown in Fig. 9, to the point 80 where the radius intersects with the perimeter 81 of the circle.

As is apparent from the construction shown and described, any predetermined size of hole, within the limits of the device, can easily be made; the operation consisting in first piercing the hole at the center of the spot where the hole is to be cut, or piercing at a point some where within the perimeter of the circular opening; after which the torch is moved in the manner previously described through proper operation of the crank 53; the indicating dial having previously been set to cut a hole of desired size.

After the torch has been moved through a complete circle and therefore the cutting of a hole completed, it is evident that a second hole, of similar size, may be cut by simply reversing the operating crank 53 so as to move the torch-tip back to the starting point disclosed in Figs. 5 and 7; then releasing the cam 24 so as to permit the device to be slid longitudinally of the gage 37 to the point where the second hole is to be cut, which is determined by the position of stop-collar 41.

As clearly shown by the drawings, the motion of the torch-tip is controlled, first by the radius eccentric member 55 and the prearranged period of time when positive relation results between the driving means or gear 56 and eccentric 62. Prior to the positive relation just referred to, the frictional resistance, provided by suitable means in connection with eccentric member 62, prevents rotation of eccentric 62 during the initial rotation of eccentric 55; the positive relation between driving gear 56 and eccentric 62, however, overcomes the frictional resistance and the same radius, obtained by the initial movement of eccentric 55, is maintained as long as the eccentric 62 is driven in similar or counter-clockwise direction; whereas reverse motion of the operating crank 53 in counter-clockwise direction and therefore reverse rotation of driving gear 56 in clockwise direction, will cause the torch tip to be carried backward to the center or initial starting point of the hole.

In order to determine the centered position of the torch-tip, the guide member 48 is provided with an arrow or indicating point 83, see Fig. 2, as is also the cap 70, as shown at 84; the two arrows being alined, as shown in Fig. 2, when such centered position of the torch-tip has been obtained. After the torch has been thus centered, the nut 58 may be loosened and the gear 56 revolved by means of crank 53, so that the arrow 82 on the drive-gear 56 registers with the desired graduation on the dial 57 to determine the size of hole it is intended to cut. Such positioning of the mechanism having been obtained, the nut 58 is then screwed up tightly against the extension of dial 57 which, in turn, pushes or presses gear 56 firmly against the shoulder 59 formed on the radius eccentric 55 and clamps the gear tightly in position, with the result that gear 56 and eccentric 55 are made to rotate together.

One end of radius eccentric 55 is fluted, as shown at 84, in Figs. 1 and 3, in order to provide a suitable grasp for controlling the eccentric while nut 58 is being screwed into place.

Before the device is put into operation, the size of hole to be cut must be determined upon and the device adjusted accordingly; such adjustment being accomplished by grasping the fluted end 84 of eccentric member 55 in order to permit nut 58 to be loosened. This will permit the rotation of gear 56 independently of the rotation of eccentric member 55. The dial member 57 is caused to rotate with eccentric 55 by means of a suitable pin 85 secured in eccentric member 55 and disposed into a slot 86 formed in the sleeve portion of dial member 57, as shown in Fig. 3; the slot 86 enabling the dial to be moved lengthwise of eccentric 55 into and out of clamping relation with gear 56 through the action of nut 58. A cover-plate 87 is provided for the eccentric 62 on the side adjacent gear 56 so as to hold the eccentric in operative position in frame member 32; the cover-plate 87 being maintained in position on the eccentric by means of suitable screws, as at 88, see Fig. 2; while the other side of eccentric member 62 is shown flanged, see Fig. 3, and positions the member in the frame 32.

In Fig. 10, I show a modified form for providing frictional resistance for the eccentric member 62. Instead of employing the leather friction disk illustrated in Fig. 6, the extension 66 is provided with a plunger 89 which is provided with a beveled tooth portion adapted to extend into a beveled notch or slot in the circumference of eccentric member 62; the plunger 89 being shown provided with a stem portion 90 slidably mounted in the plug 91 so that the plunger 89 may have movement lengthwise of the housing or extension 66. The plunger is held in frictional relation with the circumference of eccentric 62 by means of a suitable spring 92; the tension whereof may be controlled by the extent to which plug 91 is screwed into extension 66.

From the construction shown in Fig. 10, it is evident that eccentric member 62 may be free to rotate in counter-clockwise direction so as to carry the torch-tip through the arc of a circle after positive relation between gear 56 and eccentric 62 has been established, namely when the length of the radius movement of eccentric member 55 has been completed; the beveled surface of plunger 89 and beveled notch in eccentric member 62 permitting movement of member 62 in counter-clockwise direction. The movement of eccentric member 62 in clockwise direction, through the reverse operation of crank 53, is permitted until the tooth end of the plunger 89 reaches the notch cut in the surface of eccentric 62, when the eccentric member will be positively locked against further rotation in clockwise direction; and this locking relation determines the moment when the torch-tip has been brought back to the center of the hole and in position to pierce a second hole in the metal to be cut.

In Figs. 11 to 14, I illustrate another modified form for inducing the rotative movements of the two eccentric members whereby the torch is carried from the center of the hole through an arcuate radius and thence about in a circle of a size commensurate with the radius initially described by the independent movement of the radius eccentric member 55.

In the construction shown in these figures, instead of employing the dowel-pin 61, gear 93, (which takes the place of gear 56 previously described) is provided with a cam 94 which is disposed through a suitable opening in the cover-plate 87 and extends into an arcuate slot 95 formed in the eccentric member 96.

The formation of the cam 94 is more clearly shown in Fig. 11, and is made integral with gear 93; the cam 94 being adapted to engage a tooth 97 secured to the end of the plunger or guide-stem 98. The tooth 97 extends into a lug 99, and the lug 99 extends into a slot 100 formed in the side of the extension or housing 101 and is adapted to keep the tooth 97 from rotating. The slot 95 in the side of eccentric member 96 is so formed as to allow cam 94 to move along in said arcuate slot of the eccentric member 96 through the arc of a circle, namely approximately 180 degrees in clockwise direction. The gear 93, provided with the cam 94, is held in firm frictional relation with eccentric member 55 by dial member 57, which, in turn, is forced against the gear 93 by nut 58. By setting the cam 94, as shown in Fig. 13, with the mark one and one-eighth (1⅛) on the indicating dial 57 opposite the arrow 82 on gear 93, the torch carrying spindle 68 will be located at the longitudinal center of the eccentric member 96; and by revolving gear 93 in counter-clockwise direction, radius eccentric member 55 is carried to the position shown in Fig. 14, where the cam 94 lifts the tooth 97 out of the slot formed in the circumference of eccentric member 96, and the cam, at the same time, being brought into abutting relation with the shoulder 102 at the end of the slot in eccentric member 96, so as to effect a positive relation between eccentric member 96 and gear 93 which causes the eccentric member 96 to revolve with gear 93 against the friction of the spring 103 in the extension or housing 101.

It is evident from the construction shown in Fig. 11 that positive forward and reverse movement of eccentric member 96 is effected through the cam 94 coming into abutting relation with the shoulders at the ends of the arcuate slot 95 formed in the side of the eccentric 96.

In Fig. 15 I show the torch-nozzle 78 provided with a tip or pointer 104 adapted to assist in the proper centering or alining of the nozzle of the torch, which alining is accomplished by bringing the arrow 83 on the guide member 48 into register with the arrow 84 on the cap member 70. When these two arrows are in alinement, the torch-tip, or rather the nozzle of the torch, will be in alinement with the longitudinal axis or center of eccentric members 62 in the first ten figures and 96 in Figs. 11 to 14; the vertical position of the torch-tip, relative to the top and bottom of the rails to be cut or pierced, being determined by adjustment of hand-wheel 33.

As is evident from the foregoing description and constructions shown in the accompanying drawings, I can obtain any vertical or horizontal position of the hole, which may be pierced at the center, or at some point within the perimeter of the hole required; my improved device comprising two variable members, so adjusted as to carry the cutting torch from the center or initial starting point of the hole in a radial direction of predeterminable length and thence in a circumferential manner describing a circle of a diameter commensurate with the radius described in the initial movement of the torch.

I have shown and described the device provided with clamping means of a particular type for securing the device to the head of a rail, but other forms of clamping means may be provided for securing the device to the structural shapes or rails; and other modifications in certain details of construction may be provided without departing from the spirit of my invention, as set forth in the appended claims.

What I claim is:—

1. A device of the class described, comprising clamping means for securing the device in place, blow-pipe holding means having variable rotation whereby the blow-pipe is initially moved through the radius of a predeterminable circle and then moved in a circular manner about said described radius, and means whereby said second mentioned means are operated.

2. A device of the class described, comprising attaching means for securing the device to the element to be operated on, a pair of variably revoluble members, one member being mounted within the other, a blow-pipe or torch carried by one of said members and caused to move through the radius of a predetermined circle, while the second member is adapted to cause the blow-pipe to move through said predetermined circle, and means whereby both of said members are given their predetermined rotation.

3. A device of the class described, comprising means whereby the device may be clamped onto the element to be operated on, a pair of revolubly mounted members, one of said members being mounted eccentrically within the other and having independent rotation to a predetermined extent, a blow-pipe or torch-holding element carried by said eccentrically mounted member whereby the blow-pipe or torch is moved through the radius of a predetermined circle, while the other member is adapted to carry the blow-pipe or torch through said predetermined circle, means whereby the extent of independent rotation of the eccentrically mounted member and therefore the radius to be described may be regulated, and means whereby said members are given their predetermined rotations.

4. A hole-cutting device, comprising means for attaching the same to the element to be operated on, a pair of revolubly mounted members, one of said members being eccentrically mounted within the other and having independent rotation to a predetermined extent, blow-pipe holding means eccentrically mounted in said eccentrically mounted member, whereby the last mentioned means is caused to move through the radius of a predetermined circle during the independent rotation of said member, while rotation of the other member is adapted to carry said means through said predetermined circle concentric with said last mentioned member, and means whereby both members are given their predetermined movements.

5. A device of the class described, comprising means for clamping the device to the element to be operated on, a pair of rotatably mounted members, the one member being eccentrically mounted within the other, means whereby the eccentrically mounted member is permitted rotation independently of the other member for a predeterminable period when both members are made to rotate in unison, torch-carrying means eccentrically mounted in the eccentrically mounted member whereby the torch-carrying means is initially made to move in a radial manner during the independent rotation of said member and then caused to move in a circle concentric with the other member, means whereby the position of the torch-carrying means, relative to the element to be operated on, may be controlled, and means whereby both of said members are revolved.

6. A device of the class described, comprising a frame, means secured to one end of the frame whereby the device may be clamped on the rail to be operated on, a portion of said frame being vertically adjustable, a pair of rotatably mounted members mounted in said vertically adjustable frame-portion, one of said members being eccentrically mounted within the other, rotating means secured to one of said members, means intermediate of said rotating means and the other member whereby the last mentioned member is caused to rotate with said means and the eccentrically mounted member when the eccentrically mounted member reaches a predeterminable point in its rotation, and blow-pipe carrying means eccentrically mounted in the eccentrically mounted member.

7. A device of the class described, comprising a frame adapted to be secured on the rail to be pierced, a pair of members rotatably mounted in said frame, the one member being eccentrically mounted within the other, means intermediate of the two members whereby the latter are rotated, said means having positive relation with the eccentrically mounted member during the initial rotation thereof and adapted to effect positive relation with the second member during the remainder of the rotation in similar direction, and blow-pipe carrying means mounted in said eccentrically mounted member.

8. A hole-cutting device, comprising a frame, a portion whereof is adapted to extend transversely of the rail to be pierced, means whereby the frame is clamped in position, a portion of said frame being vertically adjustable, a pair of members rotatably mounted in said vertically adjustable frame portion, the one member being eccentrically mounted within the other, means intermediate of the two members whereby the latter may be rotated, said means being adjustable and having operative relation with the eccentrically mounted member during the initial part of its operation and adapted to effect operative relation with the other member during the remainder of the operation, and blow-pipe carrying means carried by said eccentrically mounted member.

9. A hole-cutting device, comprising a frame adapted to extend transversely of the element to be operated on, means whereby said frame is clamped into place, a portion of said means being vertically adjustable, a pair of rotatable members carried by said adjustable frame portion, the one member being eccentrically mounted within the other, adjustable means intermediate of said members whereby the eccentrically mounted member is initially, independently rotated to a predetermined extent and then rotation imparted to the second member, blow-pipe carrying means eccentrically mounted in the eccentrically mounted member, and means secured to the last mentioned means whereby the blow-pipe nozzle is clamped in alinement with the longitudinal axis of said blow-pipe carrying means.

10. A device of the class described, comprising a frame portion adapted to be secured to the element to be operated on, a pair of rotatably mounted members secured in said frame portion, the one member being eccentrically mounted within the other, means whereby the outer member is held against rotation, adjustable means intermediate of the two members and in positive operative relation with the eccentrically mounted member whereby the latter is independently rotated for a predeterminable extent and positive operative relation then effected with the other or outer member so as to rotate the same against said first mentioned means, and blow-pipe carrying means eccentrically mounted in said eccentrically mounted member.

11. A device of the class described, comprising a frame having a portion adapted to extend transversely of and into clamping relation with the element to be operated on, a portion of said frame being vertically adjustable, a pair of rotatable members carried by said vertically adjustable frame portion, one of said members being eccentrically mounted within the other, means whereby the outer member is frictionally held against rotation in one direction and positively held against rotation in reverse direction, adjustable means secured on the eccentrically mounted member and in positive relation therewith so as to impart rotation to said member, means intermediate of said adjustable means and the second or outer member whereby rotation of the eccentrically mounted member is imparted to said outer member after the eccentrically mounted member has reached a predeterminable point in its rotation, and torch-carrying means carried by said eccentrically mounted member.

12. A device of the class described, comprising a frame portion adapted to have clamping relation with the element to be operated on, a pair of rotatable members, the one member being eccentrically mounted within the other, means whereby the outer member is held against rotation, adjustable means operatively connected to the eccentrically mounted member whereby the latter is independently rotated to a predeterminable extent and positive operative relation then effected with the second or outer member so as to rotate the latter against said first mentioned means, blow-pipe carrying means eccentrically mounted in the eccentrically mounted member, means whereby the position of the blow-pipe holding means, relative to the outer member, may be determined, and means whereby the two members may be rotated.

13. A device of the class described, comprising a frame portion adapted to be clamped to the element to be operated on, a pair of rotative members carried by said frame portion, one of said members being eccentrically mounted within the other, a driving gear whereby rotative movement to said members is imparted, means for clamping the driving gear to said eccentric member in predetermined positions, means whereby operative relation between said driving gear and the other or outer rotative member is effected when the eccentric member has reached the predetermined position in its rotation, blow-pipe carrying means secured to said eccentrically mounted member so as to be moved therewith, and means for clamping the blow-pipe to said holding means.

14. A device of the class described, comprising a frame portion, a pair of rotative members carried by said frame-portion with one member eccentrically mounted in the other, means whereby the outer member is held against rotation, a driving gear secured to the eccentrically mounted member, means intermediate of the driving gear and the outer member whereby said first means are forced out of holding relation with the outer member and the latter caused to rotate with the gear, means for determining the position of the eccentrically mounted member and driving gear relative to the outer member, and blow-pipe carrying means secured to the eccentrically mounted member.

15. A device of the class described, comprising a frame portion, a pair of rotative members carried by said frame portion, one of said members being eccentrically mounted within the other, means whereby the outer member is held against rotation, a driving gear secured to the eccentrically mounted member, means intermediate of the gear and the outer member whereby said outer member is caused to move the gear against the action of said first means, blow-pipe carrying means eccentrically mounted in the eccentrically mounted member, and means whereby the initial piercing position of the blow-pipe may be determined.

16. A device of the class described, comprising clamping means for securing the device to the element to be operated on, blow-pipe holding means having variable movement whereby the blow-pipe is initially moved through a predetermined radius and then moved in a circular manner about said radius, means for centering said blow-pipe, and means whereby the second mentioned means are operated and the radius of the circle described controlled.

17. A device of the class described, comprising clamping means for securing the device to the element to be operated on, blow-pipe holding means having variable movement whereby the blow-pipe is initially moved through the radius of a predetermined circle and then moved in a circular manner so as to encircle the initial piercing point, means whereby the second mentioned means are operated and the degree of radial movement determined, and means whereby the blow-pipe holding means may be vertically and horizontally adjusted relative to the element operated on.

18. A device of the class described, comprising a pair of rotatably mounted members, the one member being eccentrically mounted within the other, a driving gear secured to said eccentrically mounted member, slot and pin connection intermediate of said driving gear and the other or outer member whereby the latter is rotated when the eccentrically mounted member reaches a predeterminable point in its rotation, and blow-pipe carrying means mounted in said eccentrically mounted member.

WILLIAM J. LEIGHTY.

Witnesses:
GEORGE HEIDMAN,
F. A. FLORELL.